(12) United States Patent
Matsui et al.

(10) Patent No.: US 9,283,956 B2
(45) Date of Patent: Mar. 15, 2016

(54) HYBRID VEHICLE RAPID DECELERATION CONTROL DEVICE

(75) Inventors: Hiroki Matsui, Ebina (JP); Haruhisa Tsuchikawa, Yokohama (JP); Hiroki Shimoyama, Sagamihara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 137 days.

(21) Appl. No.: 13/880,463

(22) PCT Filed: Oct. 5, 2011

(86) PCT No.: PCT/JP2011/072983
§ 371 (c)(1),
(2), (4) Date: Apr. 19, 2013

(87) PCT Pub. No.: WO2012/053360
PCT Pub. Date: Apr. 26, 2012

(65) Prior Publication Data
US 2013/0211653 A1 Aug. 15, 2013

(30) Foreign Application Priority Data
Oct. 21, 2010 (JP) .................. 2010-236049

(51) Int. Cl.
*B60W 10/02* (2006.01)
*B60W 20/00* (2006.01)
(Continued)

(52) U.S. Cl.
CPC .................. *B60W 20/40* (2013.01); *B60K 6/48* (2013.01); *B60W 10/02* (2013.01); *B60W 10/06* (2013.01);
(Continued)

(58) Field of Classification Search
CPC ..... B60W 20/40; B60W 10/06; B60W 10/02; B60W 30/18109; B60W 2600/00; B60W 2710/0627; B60W 2520/105; B60K 6/48; B60K 2006/4825; F02N 11/0822; F02N 2200/103; F02N 2200/101; F02N 2200/102; F02D 41/123; F02D 2250/28; F02D 41/065; Y02T 10/6252; Y02T 10/6221; Y02T 10/48; Y10S 903/93
USPC .................... 701/22, 48, 70, 84, 86; 903/930; 180/65.265
See application file for complete search history.

(56) References Cited

U.S. PATENT DOCUMENTS 6,335,573 B1 * 1/2002 Eguchi et al. ............... 290/40 C
7,559,387 B2 * 7/2009 Tamai ...................... 180/65.285
(Continued)

FOREIGN PATENT DOCUMENTS

JP 2004-239161 A 8/2004
JP 2006-161565 A 6/2006
(Continued)

OTHER PUBLICATIONS

Japanese Office Action dated Apr. 1, 2014, (2 pgs.).

*Primary Examiner* — Jason Holloway
(74) *Attorney, Agent, or Firm* — Foley & Lardner LLP

(57) ABSTRACT

Provided is a hybrid vehicle in which a motor/generator 5 is positioned between an engine 1 and an automatic transmission 3, the engine 1 and the motor/generator 5 are connected through a first clutch 6 and a second clutch 7 is provided between the motor/generator 5 and a drive road wheel 2. In an HEV mode in which the first clutch 6 is engaged, when deceleration of a vehicle is determined to be rapid deceleration of a threshold value or greater, the first clutch 6 is released and at the same time fuel supply to the engine 1 is stopped through an engine controller 21. Even when, due to rapid decelerating, the engine speed Ne drops to an idling speed or lower due to delay in the release of the first clutch 6, there is no combustion or explosion and thus floor vibration does not occur.

12 Claims, 5 Drawing Sheets

(51) Int. Cl.
*F02D 41/12* (2006.01)
*F02N 11/08* (2006.01)
*B60K 6/48* (2007.10)
*B60W 10/06* (2006.01)
*B60W 30/18* (2012.01)
*F02D 41/06* (2006.01)

(52) U.S. Cl.
CPC ......... B60W 20/00 (2013.01); B60W 30/18109 (2013.01); F02D 41/123 (2013.01); F02N 11/0822 (2013.01); *B60K 2006/4825* (2013.01); *B60W 2520/105* (2013.01); *B60W 2600/00* (2013.01); *B60W 2710/0627* (2013.01); *F02D 41/065* (2013.01); *F02D 2250/28* (2013.01); *F02N 2200/101* (2013.01); *F02N 2200/102* (2013.01); *F02N 2200/103* (2013.01); *Y02T 10/48* (2013.01); *Y02T 10/6221* (2013.01); *Y02T 10/6252* (2013.01); *Y10S 903/93* (2013.01)

(56) References Cited

U.S. PATENT DOCUMENTS

| 8,326,503 | B2* | 12/2012 | Kojima | 701/68 |
| 8,608,617 | B2 | 12/2013 | Stervik | |
| 2006/0131085 | A1* | 6/2006 | Tamai | 180/65.2 |
| 2009/0018757 | A1* | 1/2009 | Kobayashi et al. | 701/112 |
| 2009/0037073 | A1* | 2/2009 | Jung et al. | 701/101 |
| 2009/0312889 | A1* | 12/2009 | Krupadanam et al. | 701/1 |
| 2010/0298092 | A1* | 11/2010 | Tsuchikawa | 477/71 |
| 2012/0215392 | A1* | 8/2012 | Hashimoto | 701/22 |
| 2013/0118855 | A1* | 5/2013 | Hwang et al. | 192/85.63 |

FOREIGN PATENT DOCUMENTS

| JP | 2010-149630 A | 7/2010 |
| JP | 2011-521822 A | 7/2011 |
| SU | 1831454 A3 | 7/1993 |
| WO | WO 2009/136819 A9 | 11/2009 |

* cited by examiner

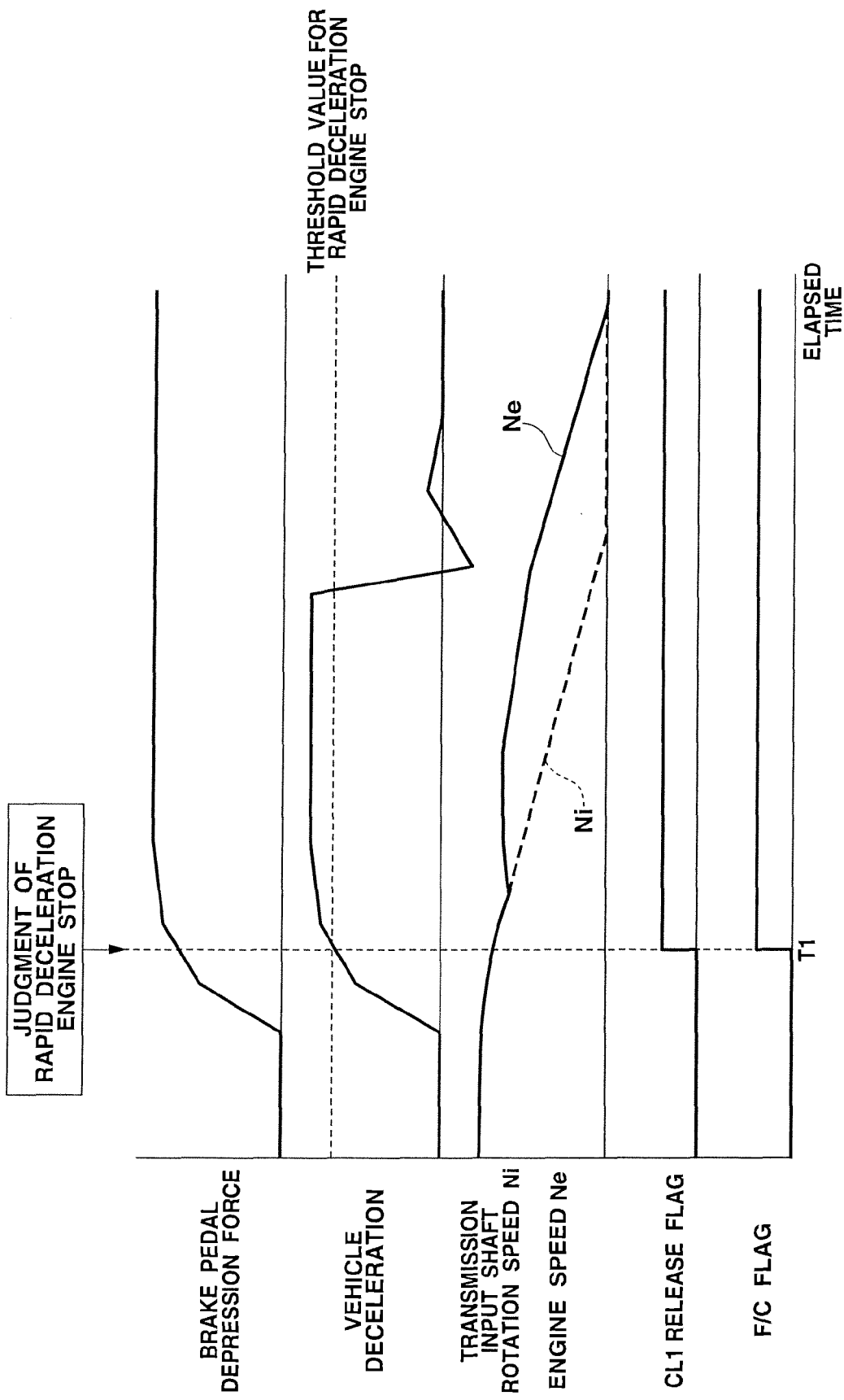

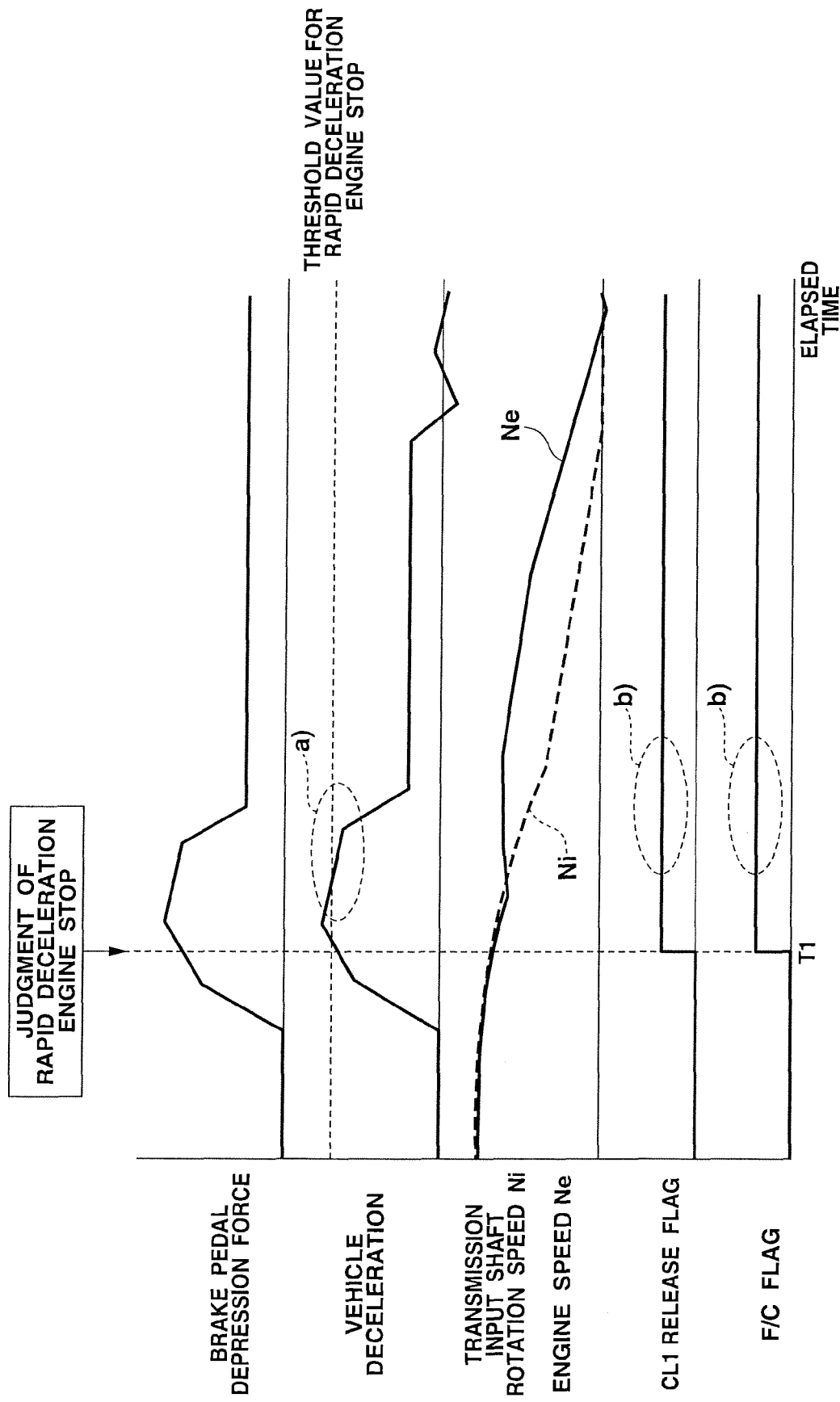

HYBRID VEHICLE RAPID DECELERATION CONTROL DEVICE

TECHNICAL FIELD

The present invention relates to a rapid deceleration control device of a hybrid vehicle that is equipped with an engine and a motor as power sources and a clutch disposed therebetween.

BACKGROUND ART

As is disclosed in Patent Document 1 and other known documents, a hybrid vehicle is widely known, which has, as a vehicle drive system, an engine, a transmission, a motor (usually, motor/generator) interposed between the engine and the transmission and a clutch interposed between the motor and the engine to operatively connect and disconnect these motor and engine.

In Patent Document 1, there is disclosed a rapid deceleration control that is carried out in such hybrid vehicle. In the control, deceleration of the vehicle is detected and when the detected deceleration is rapid deceleration exceeding a predetermined value, the clutch between the motor and the engine is disengaged thereby to release the engine from the motor and thus from drive road wheels. That is, by disengaging the clutch in advance based on the deceleration of the vehicle, undesired engine stall caused by an excessive engine speed reduction resulting from the vehicle speed reduction is suppressed.

However, in the above-mentioned control in which only disengagement of the clutch is carried out upon the rapid deceleration of the vehicle, it tends to occur that the disengagement of the clutch through a hydraulic pressure is somewhat delayed depending on the condition and in such case, the engine speed is brought to a resonant speed (viz., an engine speed that causes a resonance of a vibration system including an engine mount) thereby to increase the possibility of vibration of a floor of the vehicle body.

PRIOR ART DOCUMENT

Patent Document

Patent Document 1: Japanese Laid-open Patent Application (Tokkai) 2010-149630

SUMMARY OF INVENTION

A rapid deceleration control device according to the present invention is based on a hybrid vehicle in which a motor is positioned between an engine and drive road wheels and the engine and the motor are connected through a clutch. The rapid deceleration control device is equipped with a rapid deceleration judging means that judges whether or not the deceleration of the vehicle is rapid deceleration of a predetermined value or greater, and when, during running of the vehicle with the clutch kept engaged, the rapid deceleration judging means judges that the deceleration is the rapid deceleration, feeding of fuel to the engine is stopped by a fuel cut means.

That is, upon rapid deceleration of the vehicle due to a rapid brake operation by a driver or the like, the fuel supply to the engine is stopped. Accordingly, even if the engine speed is brought to the resonant speed or its vicinity due to the delayed disengagement of the clutch, combustion or explosion is not produced in the engine and thus the floor vibration is suppressed.

According to the present invention, undesired vehicle body vibration, which would be caused by the change of the engine speed to the resonant speed or its vicinity, can be assuredly avoided.

BRIEF DESCRIPTION OF DRAWINGS

FIG. 6 is a time chart depicting behavior of various portions at the time when the rapid deceleration control is being carried out.

FIG. 7 is a time chart showing different behavior of the various portions at the time when the rapid deceleration control is being carried out.

EMBODIMENTS FOR CARRYING OUT INVENTION

In the following, an embodiment of the present invention will be described in detail with reference to the accompanying drawings.

Figure 1:
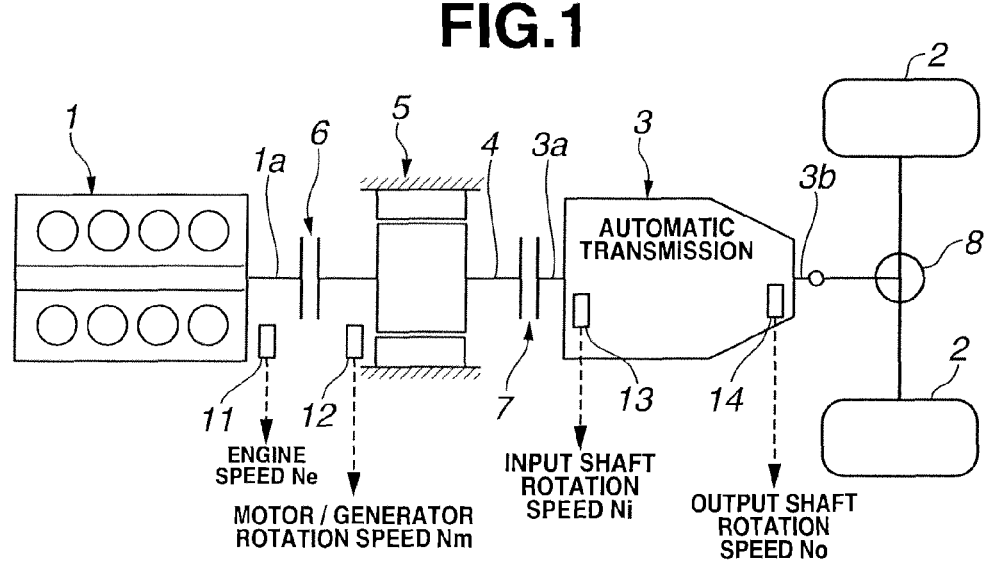
FIG. 1 is an illustration of one example of a power train of a hybrid vehicle to which the present invention is practically applied.

First, a basic construction of a hybrid vehicle to which the present invention is applied will be described. FIG. 1 shows a power train of a hybrid vehicle of "front engine-rear drive" type (FR) to which one embodiment of the present invention is applied. Denoted by numeral 1 is an engine and denoted by 2 and 2 are drive road wheels (rear road wheels). It is to be noted that the present invention is not limited to such FR type and is applicable to other types for example FF type, RR type, etc.

In the power train of the hybrid vehicle shown in FIG. 1, an automatic transmission 3 is arranged in tandem at an axially rear position of the engine 1 like common rear wheel drive vehicles, and a shaft 4 that transmits a rotation of the engine 1 (crankshaft 1a) to an input shaft 3a of the automatic transmission 3 is integrally provided with a motor/generator 5.

The motor/generator 5 is a synchronous type motor that uses permanent magnets as a rotor, serves as not only a motor (so-called "power running") but also a generator or electric dynamo (so-called "regeneration") and is arranged between the engine 1 and the automatic transmission 3 as is mentioned hereinabove. Between the motor/generator 5 and the engine 1, more specifically, between the shaft 4 and the engine crankshaft 1a, there is arranged a first clutch 6 that selectively connects and disconnects the engine 1 and the motor/generator 5.

The first clutch 6 is constructed to continuously vary its transmission torque capacity. For example, the clutch 6 may be a dry single disc clutch of normally closed type or a wet multiple disc clutch of the same type, that can vary its transmission torque by continuously controlling a clutch operating hydraulic pressure with the aid of a proportional solenoid valve or the like.

Furthermore, between the motor/generator 5 and the drive road wheels 2, more specifically, between the shaft 4 and a transmission input shaft 3a, there is arranged a second clutch 7 that selectively connects and disconnects the motor/generator 5 and the automatic transmission 3.

Like the above-mentioned first clutch 6, the second clutch 7 is constructed to continuously vary its transmission torque capacity. For example, the clutch 7 may be a wet multiple disc clutch or a dry single disc clutch, that can vary its transmission torque by continuously controlling a clutch operating hydraulic pressure with the aid of a proportional solenoid valve.

The automatic transmission 3 is of a type that establishes a variable speed level of seven forward speeds and one reverse by selectively engaging and disengaging a plurality of frictional elements (clutches and brakes) for providing various types of combination of engagement/disengagement of the frictional elements. That is, in the automatic transmission 3, the rotation inputted through the input shaft 3a is subjected to a speed change in accordance with a selected speed level and then outputted to an output shaft 3b. The output rotation is distributed to the right and left drive road wheels (rear wheels) 2 through a differential gear device 8. It is to be noted that the automatic transmission 3 is not limited to the above-mentioned stepwise type. That is, the transmission 3 may be a continuously variable transmission.

In the above-mentioned power train, two running modes can be established, one being an electric vehicle running mode (EV mode) in which the vehicle running is carried out by using only the power of the motor/generator 5 as a power source and the other being a hybrid running mode (HEV mode) in which the vehicle running is carried out by using both the engine 1 and the motor/generator 5 as a power source. For example, in a low load and low vehicle speed condition that takes place when the vehicle starts from its standstill, the EV mode is required. In this EV mode, the power of the engine 1 is not needed and thus, the engine 1 is stopped, and the first clutch 6 is disengaged and the second clutch 7 is engaged and at the same time the automatic transmission 3 is controlled to be in a power transmitting state. By keeping this condition, the vehicle running is carried out by only the motor/generator 5.

Furthermore, in a high speed running and/or a high load running of the vehicle, the HEV mode is required. In this HEV mode, both the first and second clutches 6 and 7 are engaged and at the same time the automatic transmission 3 is controlled to be in the power transmitting state. In this condition, both the output rotation from the engine 1 and the output rotation from the motor/generator 5 are inputted to the transmission input shaft 3a, and thus the hybrid running by the two power sources is carried out.

Upon deceleration of the vehicle, the motor/generator 5 recovers energy by regenerating damping energy, and in the HEV mode, the motor/generator 5 can recover a redundant energy of the engine 1 as electric power.

When the vehicle running mode is shifted from the EV mode to the HEV mode, the first clutch 6 is engaged and engine start is carried out by using a torque of the motor/generator 5. During this mode change, a slip engagement of the first clutch 6 is made by suitably controlling the transmission torque capacity of the first clutch, so that a smoothed mode shift is obtained.

Furthermore, the second clutch 7 serves as a so-called start clutch, and when the vehicle is about to start, a slip engagement of the second clutch 7 is made by suitably controlling the transmission torque capacity of the second clutch, so that a smoothed start of the vehicle is obtained while absorbing torque fluctuations even though the power train is not provided with a torque converter.

In the arrangement of FIG. 1, the second clutch 7 provided in the power train from the motor/generator 5 to the drive road wheels 2 is positioned between the motor/generator 5 and the automatic transmission 3. However, if desired, as is seen from the example of FIG. 2, the second clutch 7 may be positioned between the automatic transmission 3 and the differential gear device 8.

Figure 2:
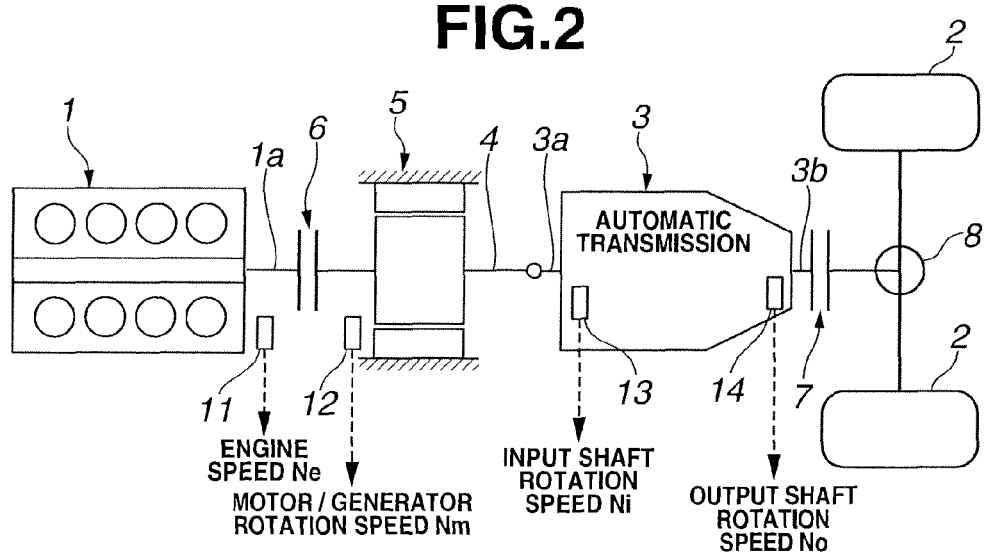
FIG. 2 is an illustration of another example of the power train of a hybrid vehicle to which the present invention is practically applied.

In the examples of FIGS. 1 and 2, a dedicated device as the second clutch 7 is provided at a front position or rear position of the automatic transmission 3. However, if desired, as is seen FIG. 3, existing frictional elements in the automatic transmission 3 used for establishing a forward speed or a reverse may be used as the second clutch 7. In this case, the second clutch 7 is not always one frictional element. That is, any suitable frictional element can be the second clutch 7 in accordance with the variable speed level.

Figure 3:
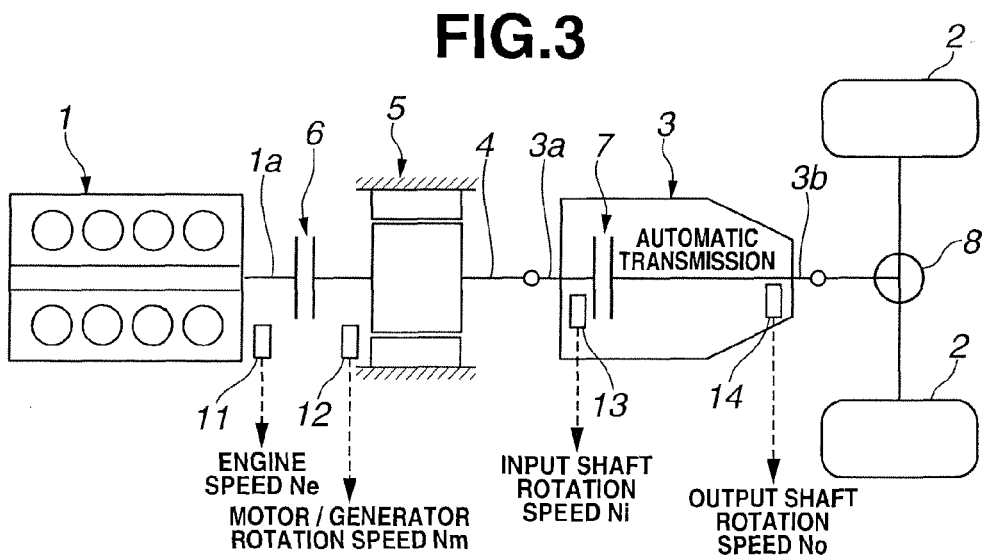
FIG. 3 is an illustration of still another example of the power train of a hybrid vehicle to which the present invention is practically applied.
Figure 4:
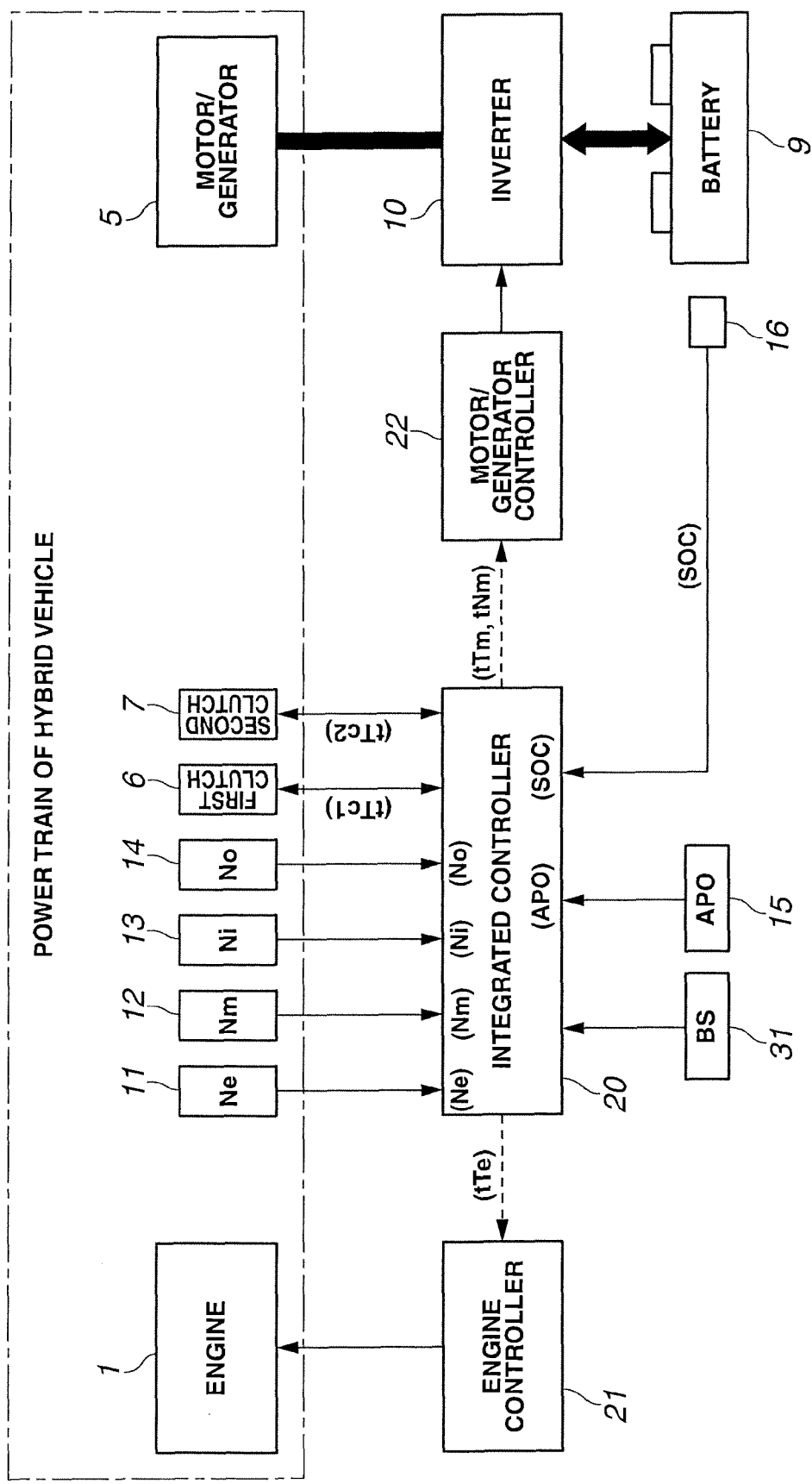
FIG. 4 is a block diagram depicting a control system for the power train.

FIG. 4 shows a control system for the power train of the hybrid vehicle that has such constructions as shown in FIGS. 1 to 3.

The control system is equipped with an integrated controller 20 that integrally controls operating points of the power train. The operating points of the power train are regulated by a target engine torque tTe, a target motor/generator torque tTm (or target motor/generator rotation speed tNm), a target transmission torque capacity tTc1 of the first clutch 6 and a target transmission torque capacity tTc2 of the second clutch 7.

The control system is provided with at least an engine speed sensor 11 that detects an engine speed Ne, a motor/generator rotation speed sensor 12 that detects a motor/generator rotation speed Nm, an input rotation speed sensor 13 that detects a transmission input shaft rotation speed Ni, an output rotation speed sensor 14 that detects a transmission output shaft rotation speed No, an accelerator open degree sensor 15 that detects an accelerator pedal depression degree (viz., accelerator open degree APO) and an electric power storage condition sensor 16 that detects an electric power storage condition SOC of the battery 9 that stores an electric power for the motor/generator 5. For determining the above-mentioned operating points, detected signals from these sensors are inputted to the integrated controller 20.

The engine speed sensor 11, the motor/generator rotation speed sensor 12, the input rotation speed sensor 13 and the output rotation speed sensor 14 are arranged for example in such a manner as is shown in FIGS. 1 to 3.

Based on the accelerator open degree APO, the electric power storage condition SOC and the transmission output shaft rotation speed No (viz., vehicle speed VSP) in the above-mentioned information, the integrated controller 20 selects a running mode (viz., EV mode or HEV mode) that realizes a driving force of the vehicle that the driver requires, and at the same time, calculates the target engine torque tTe, the target motor/generator torque tTm (or target motor/generator rotation speed tNm), the target transmission torque capacity tTc1 of the first clutch 6 and the target transmission torque capacity tTc2 of the second clutch 7.

Information on the target engine torque tTe is fed to the engine controller 21, so that the engine controller 21 controls the engine 1 in such a manner that a real engine torque Te becomes the target engine torque tTe. For example, the engine 1 is a gasoline engine, and the torque Te of the engine is controlled through a throttle valve.

While, information on the target motor/generator torque tTm (or target motor/generator rotation speed tNm) is fed to a motor/generator controller 22, so that the motor/generator controller 22 controls the motor/generator 5 through an inverter 10 in such a manner that the torque Tm (or rotation speed Nm) of the motor/generator 5 becomes the target motor/generator torque tTm (or target motor/generator rotation speed tNm).

The integrated controller 20 feeds respective solenoid valves of the first and second clutches 6 and 7 with solenoid currents that correspond to the target transmission torque capacity tTc1 of the first clutch 6 and the target transmission torque capacity tTc2 of the second clutch 7 respectively, and controls engaging conditions of the first and second clutches 6 and 7 in such a manner that the transmission torque capacities Tc1 and Tc2 of the first and second clutches 6 and 7 become the target transmission torque capacities tTc1 and tTc2 respectively.

The above-mentioned control system is equipped with a brake stroke sensor 31 that detects a manipulated variable (BS) of a brake pedal depressed by the driver, and based on the brake pedal manipulated variable BS and the vehicle speed VSP, the integrated controller 20 calculates a target deceleration. Then, the integrated controller 20 controls the regenerated braking force produced by the motor/generator 5 and at the same time controls brake units (not shown) mounted to the road wheels in such a manner that the vehicle is subjected to a deceleration that corresponds to the target deceleration.

When, under vehicle running in the HEV mode having the engine 1 and motor/generator 5 kept connected through the first clutch 6, the vehicle speed is reduced due to a deceleration, the engine speed Ne is also reduced in such a manner as is determined by a gear ratio of the automatic transmission 3. In accordance with the present invention, the following rapid deceleration control is carried out by the integrated controller 20 in order to avoid an excessive lowering of the engine speed Ne and an undesired floor vibration that would be caused by the excessive lowering of the engine speed.

Figure 5:
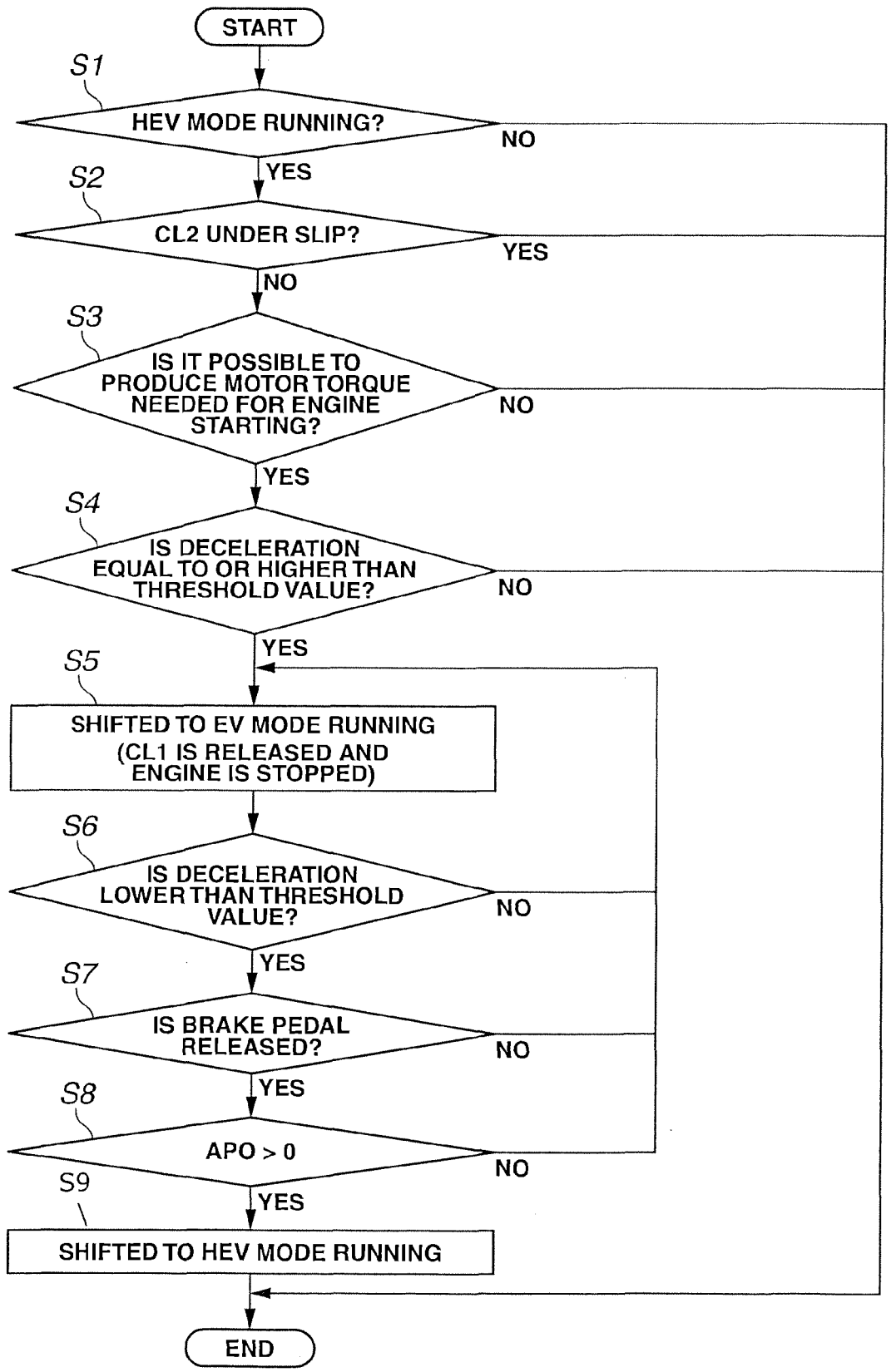
FIG. 5 is a flowchart of one example for carrying out a rapid deceleration control according to the present invention.

FIG. 5 shows a flowchart that shows a flow of operation steps executed for effecting the rapid deceleration control. The flow of the operation steps may be repeatedly carried out under running of the vehicle, or may be repeatedly carried out during operation of the brake pedal using an initial depression of the brake pedal as a trigger.

At step S1, judgment is carried out as to whether or not the present mode is the HEV mode wherein the engine 1 and the motor/generator 5 are connected through the first clutch 6. In case of the EV mode wherein the first clutch 6 is disengaged, the main routine is ended.

Then, at step S2, judgment is carried out as to whether the second clutch 7 positioned between the motor/generator 5 and the drive road wheels 2 is in a slip engagement condition or not. The second clutch 7 can be controlled to the slip engagement condition to allow a differential rotation between the front and rear members of the second clutch in various states for the purpose of absorbing torque fluctuations that are inevitably produced in a power train from the motor/generator 5 to the drive road wheels 2. When the second clutch 7 is in the slip engagement condition at the time of the rapid deceleration of the vehicle, undesired reduction of the engine speed Ne to a level lower than the idling speed can be suppressed by the slippage of the second clutch 7. Accordingly, for saving an electric power needed for restarting the engine, the following process is not carried out.

When the second clutch 7 is in a full engagement condition, the operation flow goes from step S2 to step S3, and at this step S3, for finding an additional condition for stopping the engine 1, judgment is carried out as to whether or not the present condition is able to produce a motor torque needed for restarting the engine 1 with reference to the electric power storage condition SOC of the battery 9, a warming-up condition of the engine 1, etc. For example, in case wherein the electric power storage condition SOC of the battery 9 is insufficient, the main routine is ended since restarting of the engine 1 after it is stopped is difficult.

Then, at step S4, judgment is carried out as to whether or not the deceleration of the vehicle is equal to or higher than a threshold value. This deceleration of the vehicle can be calculated from for example a change of the transmission output shaft rotation speed No (in other words, a change of vehicle speed VSP). However, if desired, the vehicle deceleration may be directly obtained by a deceleration sensor (G sensor). The threshold value may be fixed to for example about 0.3G (−0.3G in acceleration). However, if desired, the threshold value may be variable in view of the vehicle speed VSP and the like.

When it is judged that the deceleration is a rapid deceleration of the threshold value or greater, the operation flow goes to step S5 where the vehicle running mode is changed from the HEV mode to the EV mode. More specifically, the first clutch 6 is disengaged and at the same time, the fuel supply to the engine 1 is stopped through the engine controller 21 (that is, fuel cut). The engine 1 is for example a gasoline engine that is equipped with fuel injection valves that inject fuel to cylinders or intake ports of the engine. That is, upon need of the fuel cut, the fuel injection from the fuel injection valves is stopped. The fuel injection stopping is not seriously affected by a delay of mechanical actions and a delay of change in a hydraulic pressure, and thus, the fuel injection stopping can be instantly made upon generation of instruction signal without a response lag.

At step S6, judgment is carried out as to whether or not the deceleration of the vehicle has been reduced to a value smaller than the above-mentioned threshold value, and at step S7, for finding an additional condition, judgment is carried out as to whether the brake pedal has been released or not by checking a brake stroke BS, a brake pedal depression force (which is calculated from the brake stroke BS) or an actual brake pressure. Furthermore, in the present invention, at step S8, for finding an additional condition, judgment is carried out as to whether or not an accelerator pedal has been depressed by a driver by checking an information signal detected by the accelerator open degree sensor 15. Until the time when the above-mentioned three conditions are established, the operation flow goes back to step S5 and thus the vehicle running on the EV mode is continued.

When the three conditions at steps S6, S7 and S8 are established, the operation flow goes to step S9 where the vehicle running mode is changed from the EV mode to the HEV mode. That is, by carrying out cranking of the engine 1 by the force of the motor/generator 5 while causing the first clutch 6 to gradually change from the slip engagement condition to the full engagement condition, the engine 1 is restarted. When, upon arriving of the operation flow at step S9, the vehicle running mode, which is determined by the vehicle speed VSP and the accelerator open degree APO, has been already changed to the EV mode, the EV mode is kept continuously without being changed to the HEV mode as a matter of course.

FIG. 6 is a time chart depicting behavior of various portions at the time when the above-mentioned rapid deceleration control is being carried out. As shown, on the time chart, six factors are depicted in a comparative manner which are the brake pedal depression force, the vehicle deceleration, the transmission input shaft rotation speed Ni (which is determined by the vehicle speed VSP and the transmission gear ratio), the engine speed Ne, a first clutch releasing flag that corresponds to an instruction signal for instructing disengagement of the first clutch 6 and a F/C flag that corresponds to an instruction signal for instructing stopping of the fuel supply.

The example depicted by FIG. 6 corresponds to a case wherein the brake pedal is depressed by a driver and the vehicle comes to a stop with the brake pedal kept depressed. As is shown in the chart, as a result of the depression of the brake pedal, the vehicle deceleration rapidly increases, and at the time T1 when the vehicle deceleration exceeds the threshold value, the deceleration is judged as a rapid deceleration at the above-mentioned step S4. With this judgment, the first clutch releasing flag and the F/C flag are turned ON, and the first clutch 6 is disengaged and at the same time the fuel supply to the engine 1 is stopped.

Until the time when the first clutch 6 is disengaged, the transmission input shaft rotation speed Ni and the engine speed Ne are equal. However, after disengagement of the first clutch 6, the transmission input shaft rotation speed Ni reduces as is indicated by a broken line together with the vehicle speed VSP and, the speed Ne of the engine 1 subjected to the fuel stop reduces as is indicated by a solid line. Accordingly, the engine speed Ne passes the resonant speed while separating from the transmission input shaft rotation speed Ni. However, in this stage, the engine 1 has not been in a condition subjected to the combustion or explosion, and thus, the floor vibration caused by the resonance does not occur. In the time chart of FIG. 6, the shift to the HEV mode at step S8 is not shown because the brake pedal is kept depressed.

FIG. 7 shows an example that is characterized by a different time chart. That is, the example corresponds to a case wherein after a rapid deceleration, the brake pedal is partially returned toward the full release position and the vehicle comes to a stop with the brake pedal depression force kept small. Accordingly, after disengagement of the first clutch 6 and stopping of fuel supply to the engine 1 are carried out upon judgment of a rapid deceleration at the time T1, the vehicle deceleration lowers to a value smaller than the threshold value as is indicated by (a) in the time chart. However, since the brake pedal is not fully released, the EV mode is continued due to judgment at step S7. That is, as is indicated by (b) in the time chart, the released condition of the first clutch 6 and the fuel supply stopping condition are continued.

As is mentioned hereinabove, even when, under the condition of the brake pedal kept depressed, the vehicle deceleration becomes small, the stop condition of the engine 1 is continued, and thus, even when a speed reduction operation is carried out in a manner to keep the deceleration at or near the threshold value, hunting of the engine 1, viz., the phenomenon wherein stopping and restarting of the engine 1 are repeated, can be avoided, and thus, consumption of the electric power caused by the needless restarting of the engine is suppressed.

After the brake pedal is released, the engine 1 is restarted upon depression of the accelerator pedal by the driver, and thus, the restarting of the engine 1 can be carried out at a timing that meets the driver's intention for the engine restarting, and thus the driver is prevented from feeling uncomfortable.

In the above-mentioned embodiment, the three factors, which are the vehicle deceleration, the release of the brake pedal and the depression of the accelerator pedal, constitute respective conditions for the restarting of the engine. However, if desired, the restarting of the engine may be permitted by using one or two of the factors as the conditions.

The invention claimed is:

1. A rapid deceleration control device of a hybrid vehicle in which a motor is positioned between an engine and a drive road wheel and the engine and the motor are connected through a clutch,
the rapid deceleration control device comprising:
a rapid deceleration judging means for judging whether or not a deceleration of the vehicle is a rapid deceleration of a predetermined value or greater, wherein the rapid deceleration causes the engine to be disconnected from the motor through disengagement of the clutch; and
a fuel cut means for stopping feeding of fuel to the engine,
wherein when, under running of the vehicle with the clutch engaged, the rapid deceleration judging means judges that the deceleration is equal to or greater than the predetermined value, the fuel cut means stops feeding of fuel to the engine.

2. A rapid deceleration control device of a hybrid vehicle as claimed in claim 1, in which after a vehicle speed reduction is finished with the deceleration being lower than the predetermined value, restarting of the engine is permitted subject to release of a brake pedal by a driver.

3. A rapid deceleration control device of a hybrid vehicle as claimed in claim 1, in which after a vehicle speed reduction is finished with the deceleration being lower than the predetermined value, restarting of the engine is permitted subject to operation of an accelerator member by a driver.

4. A rapid deceleration control device of a hybrid vehicle as claimed in claim 1, further comprising a starting ability judging means for judging whether or not a present condition is able to produce a motor torque needed for restarting the engine with reference to an electric power storage condition of a battery, and in which the fuel cut means stops feeding of the fuel to the engine when the present condition judged is an additional condition to ensure the motor torque needed for restarting the engine.

5. A rapid deceleration control device of a hybrid vehicle as claimed in claim 1, in which a second clutch is disposed between the motor and the drive road wheel, and in which when the second clutch is not in a slip engagement condition, the fuel cut means stops feeding of the fuel to the engine.

6. A rapid deceleration control device of a hybrid vehicle in which a motor is positioned between an engine and a drive road wheel and the engine and the motor are connected through a clutch,
the rapid deceleration control device comprising:
a first controller configured to judge whether or not a deceleration of the vehicle is a rapid deceleration of a predetermined value or greater, wherein the rapid deceleration causes the engine to be disconnected from the motor through disengagement of the clutch; and
a second controller configured to cause feeding of fuel to the engine to stop when, under running of the vehicle with the clutch engaged, the first controller judges that the deceleration is equal to or greater than the predetermined value.

7. A rapid deceleration control device of a hybrid vehicle as claimed in claim 6, in which after a vehicle speed reduction is finished with the deceleration being lower than the predetermined value, restarting of the engine is permitted subject to release of a brake pedal by a driver.

8. A rapid deceleration control device of a hybrid vehicle as claimed in claim 6, in which after a vehicle speed reduction is finished with the deceleration being lower than the predetermined value, restarting of the engine is permitted subject to operation of an accelerator member by a driver.

9. A rapid deceleration control device of a hybrid vehicle as claimed in claim 6, in which the first controller further judges whether or not a present condition is able to produce a motor torque needed for restarting the engine with reference to an electric power storage condition of a battery, and in which the second controller causes feeding of the fuel to the engine to stop when the present condition judged is an additional condition to ensure the motor torque needed for restarting the engine.

10. A rapid deceleration control device of a hybrid vehicle as claimed in claim 6, in which a second clutch is disposed between the motor and the drive road wheel, and in which when the second clutch is not in a slip engagement condition, the second controller causes feeding of the fuel to the engine to stop.

11. A rapid deceleration control device of a hybrid vehicle as claimed in claim 6, in which the first controller and the second controller are separate controllers.

12. A method for controlling a rapid deceleration of a hybrid vehicle, the hybrid vehicle including a motor positioned between an engine and a drive road wheel and a clutch provided between the engine and the motor, the method comprising the steps:
judging whether or not a deceleration of the vehicle is a rapid deceleration of a predetermined value or greater, wherein the rapid deceleration causes the engine to be disconnected from the motor through disengagement of the clutch; and
stopping feeding of fuel to the engine when, under running of the vehicle with the clutch engaged, it is judged that the deceleration is equal to or greater than the predetermined value.

* * * * *